United States Patent
Ganiger et al.

(10) Patent No.: US 12,546,231 B2
(45) Date of Patent: Feb. 10, 2026

(54) HIGH-PRESSURE ROTOR CONTROL SYSTEM

(71) Applicant: General Electric Company, Schenectady, NY (US)

(72) Inventors: Ravindra Shankar Ganiger, Bengaluru (IN); Kudum Shinde, Bengaluru (IN); Weize Kang, Mason, OH (US); Surender Reddy Bhavanam, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 231 days.

(21) Appl. No.: 18/452,030

(22) Filed: Aug. 18, 2023

(65) Prior Publication Data

US 2024/0240570 A1 Jul. 18, 2024

(30) Foreign Application Priority Data

Jan. 12, 2023 (IN) .............................. 202311002461

(51) Int. Cl.
*F01D 17/16* (2006.01)
*F01D 7/00* (2006.01)

(52) U.S. Cl.
CPC .............. *F01D 17/16* (2013.01); *F01D 7/00* (2013.01); *F05D 2260/70* (2013.01); *F05D 2270/334* (2013.01)

(58) Field of Classification Search
CPC .............. F01D 17/16; F01D 7/00; F02C 9/20
See application file for complete search history.

(56) References Cited

U.S. PATENT DOCUMENTS

| | | | |
|---|---|---|---|
| 7,920,973 B2 | 4/2011 | Mollmann et al. | |
| 9,528,385 B2 * | 12/2016 | Payne | F04D 27/0246 |
| 9,617,869 B2 * | 4/2017 | LeBlanc | F04D 29/563 |
| 9,771,878 B2 | 9/2017 | Lu et al. | |
| 9,777,642 B2 | 10/2017 | Murrow et al. | |
| 10,006,374 B2 | 6/2018 | Gardner et al. | |
| 11,158,140 B2 | 10/2021 | Ismail et al. | |
| 2016/0178464 A1 | 6/2016 | Burns et al. | |
| 2021/0108595 A1 | 4/2021 | Khalid et al. | |
| 2022/0065688 A1 | 3/2022 | Ciciriello | |

* cited by examiner

*Primary Examiner* — Sabbir Hasan
(74) *Attorney, Agent, or Firm* — Venable LLP; Peter T. Hrubiec; Michele V. Frank

(57) ABSTRACT

A high-pressure (HP) rotor control system includes an HP rotor and a controller. The HP rotor includes a plurality of rotor blades that rotate about a centerline axis, and a plurality of variable stator vanes (VSVs) that are rotatable about a variable stator vane (VSV) pitch axis. The plurality of VSVs are disposed at an incidence angle. The controller controls the plurality of VSVs to rotate the plurality of VSVs about the VSV pitch axis to change the rotor incidence angle of the plurality of VSVs as the HP rotor approaches a thrust crossover condition.

20 Claims, 5 Drawing Sheets

HIGH-PRESSURE ROTOR CONTROL SYSTEM

CROSS REFERENCE TO RELATED APPLICATIONS

The present application claims the benefit of Indian patent application Ser. No. 202311002461, filed on Jan. 12, 2023, which is hereby incorporated by reference herein in its entirety.

TECHNICAL FIELD

The present disclosure relates generally to high-pressure rotors, for example, in turbine engines.

BACKGROUND

A turbine engine generally includes a fan and a core section arranged in flow communication with one another. The core section includes a compressor section, a combustor section, and a turbine section. The compressor section is coupled to the turbine section by a high-pressure rotor.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
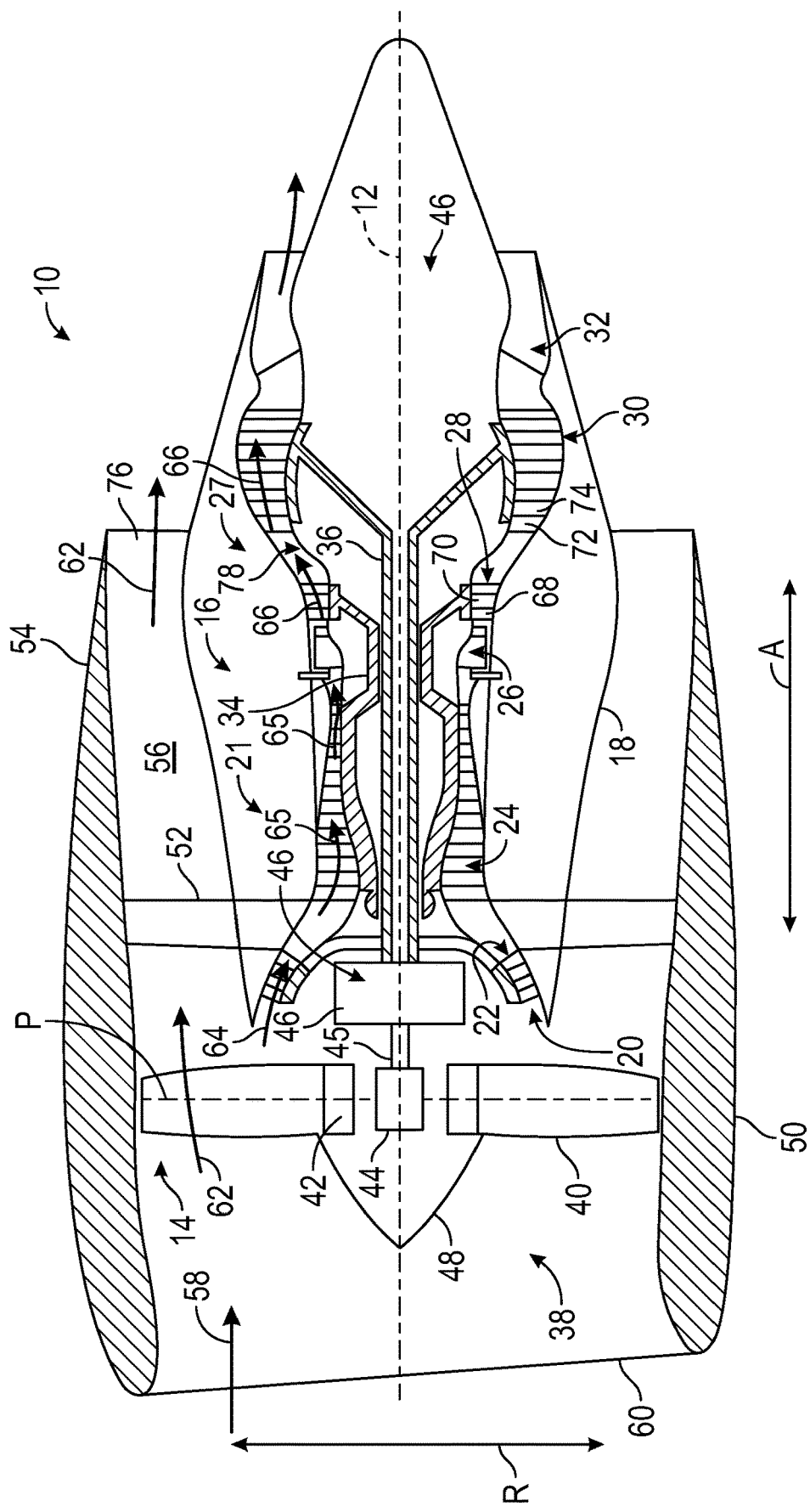
FIG. 1 is a schematic cross-sectional diagram of a turbine engine, taken along a centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "low" and "high," or their respective comparative degrees (e.g., "lower" and "higher", where applicable), when used with the compressor, turbine, shaft, or spool components, each refers to relative pressures and/or relative speeds within an engine unless otherwise specified. For example, a "low-speed" component defines a component configured to operate at a rotational speed, such as a maximum allowable rotational speed, which is lower than that of a "high-speed" component of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "thrust crossover condition," "thrust crossover, "thrust reversal condition," and "thrust reversal," are engine conditions in which an HP rotor thrust, or axial forces through the HP rotor, decreases in forward thrust and changes to aft thrust, also referred to as reverse thrust. The thrust crossover condition, or thrust crossover, includes zero thrust conditions. The thrust crossover condition and the thrust reversal condition increase vibrations in the HP rotor.

As used herein, "HP rotor thrust" is a net axial thrust in the HP rotor due to aerodynamic loads acting on the HP rotor.

Turbine engines, for example, for aircraft, include a high-pressure (HP) rotor that couples an HP compressor to an HP turbine of the turbine engine. The HP rotor includes one or more stages of stator vanes and rotor blades. The rotor blades are coupled to an HP shaft and rotate with rotation of the HP shaft about a centerline axis of the turbine engine. The stator vanes do not rotate about the centerline axis and can include variable stator vanes (VSV) that rotate about a variable stator vane (VSV) pitch axis of the VSVs. For example, the VSVs can be controlled to change an incidence angle of the VSVs to change an HP rotor thrust through the HP rotor. Typically, the VSVs are controlled to increase a stall margin of the HP compressor to avoid stalling the HP compressor.

Under certain operating conditions, the HP rotor experiences high vibrations. High vibrations in the HP rotor occur during operating conditions when the HP rotor thrust is small, is approximately zero, and/or during a thrust crossover condition. For example, the vibrations are highest during climb conditions of the turbine engine (e.g., when the aircraft is climbing). A thrust crossover condition, also referred to as thrust crossover, occurs when the speed of the HP rotor decreases and the axial forces on a forward bearing of the HP rotor are reduced to approximately zero. A thrust reversal condition, also referred to thrust reversal occurs when the speed of the HP rotor decreases beyond the thrust crossover condition and the axial forces on the forward bearing of the HP rotor are negative. The reduced axial forces on the forward bearing decreases the stiffness of the forward bearing such that the forward bearing experiences high deflections. The high deflections of the forward bearing propagate through the HP rotor, thereby causing the HP rotor to experience high vibrations during the thrust crossover condition and the thrust reversal condition. The vibrations of the HP rotor are particularly high during the thrust crossover condition, and such high vibrations decrease a lifecycle of the HP rotor, and, thus, decrease the lifecycle of the turbine engine.

Accordingly, the present disclosure provides an HP rotor control system for controlling the HP rotor (e.g., the VSVs) and changing the incidence angle of the VSVs to increase the axial forces on the forward bearing by increasing the HP rotor thrust, thereby reducing vibrations in the HP rotor as the HP rotor approaches the thrust crossover condition and the thrust reversal condition. The present disclosure also provides a related method. Changing the incidence angle of the VSVs changes the HP rotor thrust by changing the air mass flow rate in the HP compressor. Thus, the HP rotor control system controls the VSVs to regulate the air mass flow rate in the HP compressor. The HP rotor control system includes a control logic loop introduced to an engine controller, such as, for example, a Full Authority Digital Engine Control (FADEC), to control actuation of the VSVs.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low-pressure (LP) compressor 22 followed downstream by a high-pressure (HP) compressor 24, a combustion section 26, a turbine section 27 including a high-pressure (HP) turbine 28 followed downstream by a low-pressure (LP) turbine 30, and a jet exhaust nozzle section 32. A high-pressure (HP) shaft 34 or spool drivingly connects the HP turbine 28 to the HP compressor 24 to rotate the HP turbine 28 and the HP compressor 24 in unison. A low-pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2A:
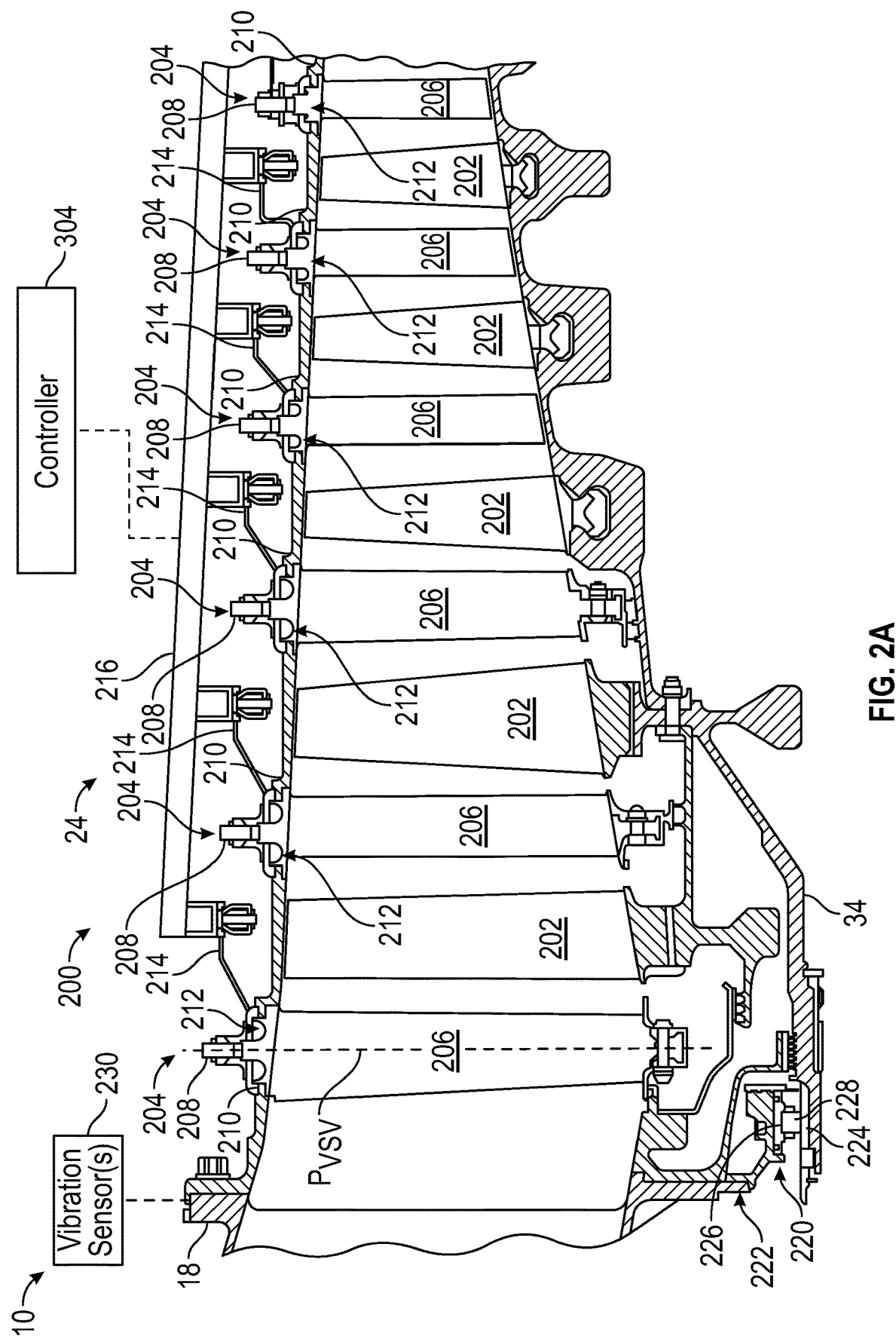
FIG. 2A is a partial enlarged schematic, cross-sectional view of a high-pressure (HP) rotor for the turbine engine of FIG. 1, taken along a centerline axis of the turbine engine, according to the present disclosure.

FIG. 2A is a partial enlarged schematic, cross-sectional view of a high-pressure (HP) rotor 200 for the turbine engine 10, taken along a centerline axis 12 (FIG. 1) of the turbine engine 10, according to the present disclosure. The HP rotor 200 is utilized as the HP compressor 24 of FIG. 1. The HP rotor 200 includes a plurality of stages, and each stage includes a plurality of rotor blades 202 and a plurality of variable stator vane (VSV) assemblies 204. The rotor blades 202 are supported by rotor disks and are coupled to the HP shaft 34. The HP shaft 34 is surrounded by the outer casing 18 that extends circumferentially around the HP compressor 24 and supports the plurality of variable stator vane assemblies 204.

Each VSV assembly 204 includes a plurality of variable stator vanes (VSVs) 206 that includes a radially outer vane stem, also referred to as a spindle 208 that extends substantially perpendicularly from a vane platform 210. The vane platform 210 extends between the plurality of VSVs 206 and the spindle 208. Each spindle 208 extends through an opening 212 defined in the outer casing 18 to enable the plurality VSVs 206 to be coupled to the outer casing 18. Each VSV 206 includes a lever arm 214 that extends from each respective VSV 206. The lever arm 214 is utilized to selectively rotate the respective VSV 206 for changing an orientation of the plurality of VSVs 206 relative to the flowpath through the HP compressor 24 to facilitate increased control of airflow through the HP compressor 24. Each lever arm 214 is coupled to one or more actuators 216 and can be independently controlled, as detailed further below. For example, each VSV 206 can rotate about a VSV pitch axis $P_{VSV}$ to change an incidence angle of the respective VSV 206. The plurality of VSVs 206 of each stage of the HP rotor 200 are rotated separately from the plurality of VSVs of the other stages of the HP rotor 200. In some embodiments, the plurality of VSVs 206 of each stage of the HP rotor 200 are rotated together with the plurality of VSVs 206 of the other stages of the HP rotor 200.

The HP rotor 200 further includes one or more bearings 220, also referred to as forward bearings. The one or more bearings 220 are located between the HP shaft 34 and a static component 222 of the HP rotor 200 such that the HP shaft 34 can rotate with respect to the static component 222. The one or more bearings 220 are ball bearings, but may include any type of bearing. The one or more bearings 220 are looking axially forward on the HP shaft 34 compared to one or more aft bearings (not shown in the view of FIG. 2A). The one or more bearings 220 include an inner race 224, an outer race 226, and one or more bearing elements 228 disposed between the inner race 224 and the outer race 226. In FIG. 2A, the one or more bearing elements 228 are balls, but the one or more bearing elements 228 can include any type of bearing element, such as, for example, slider elements or the like.

The HP rotor 200 also includes one or more vibration sensors 230 for measuring vibrations of the HP rotor 200. The one or more vibration sensors 230 are positioned to measure vibrations at the outer casing 18 of the HP rotor 200. For example, the one or more vibration sensors 230 measure an amount and a frequency of vibration of the outer casing 18. The one or more vibration sensors 230 can include any type of vibration sensor, such as, for example, piezoelectric accelerometers, displacement sensors, velocity sensors, strain gauges, gyroscopes, or the like.

During operation, as a net load from the axial thrust through the HP compressor 24 approaches zero, the stiffness in the axial direction of the one or more bearings 220 decreases, thereby causing vibrations in HP rotor 200. For example, as the speed of the HP shaft 34 decreases, the axial load on the one or more bearings 220 from the axial thrust decreases. When the axial load on the one or more bearings 220 is approximately zero, the stiffness of the one or more bearings 220 is reduced, thereby causing high vibrations in the turbine engine. For example, as the stiffness of the one or more bearings 220 decreases, the one or more bearings 220 will experience greater deflections (e.g., the inner race 224 will deflect with respect to the outer race 226). The deflections of the one or more bearings 220 propagate through the outer casing 18, causing undesired vibrations in the HP rotor 200. A thrust crossover condition is defined when the axial load on the one or more bearings 220 is approximately zero and the resulting vibrations are at substantially maximum at the thrust crossover condition. The thrust crossover condition can occur at different speeds for different engine operating modes and/or for different axial thrust conditions. Accordingly, the present disclosure provides for controlling the plurality of VSVs 206 to rotate the plurality of VSVs 206 to increase the axial thrust during certain operating modes of the turbine engine to reduce the vibrations in the HP rotor 200 at the thrust crossover condition, as detailed further below.

A controller 304 is in communication with the turbine engine 10 for controlling aspects of the turbine engine 10. For example, the controller 304 is in two-way communication with the turbine engine 10 for receiving signals from various sensors and control systems of the turbine engine 10 and for controlling components of the turbine engine 10, as detailed further below. The controller 304 controls the HP rotor 200. For example, the controller 304 is in communication with the one or more actuators 216 to actuate the lever arms 214 to control the plurality of VSVs 206 to rotate about the VSV pitch axis $P_{VSV}$. The controller 304, or components thereof, may be located onboard the turbine engine 10, onboard the aircraft, or can be located remote from each of the turbine engine 10 and the aircraft. The controller 304 can be a Full Authority Digital Engine Control (FADEC) that controls the one or more actuators 216 to actuator the lever arm 214 of each of the plurality of VSV assemblies 204 to change the incidence angle of the plurality of VSVs 206, thereby changing the axial thrust through the HP compressor 24.

Figure 2B:
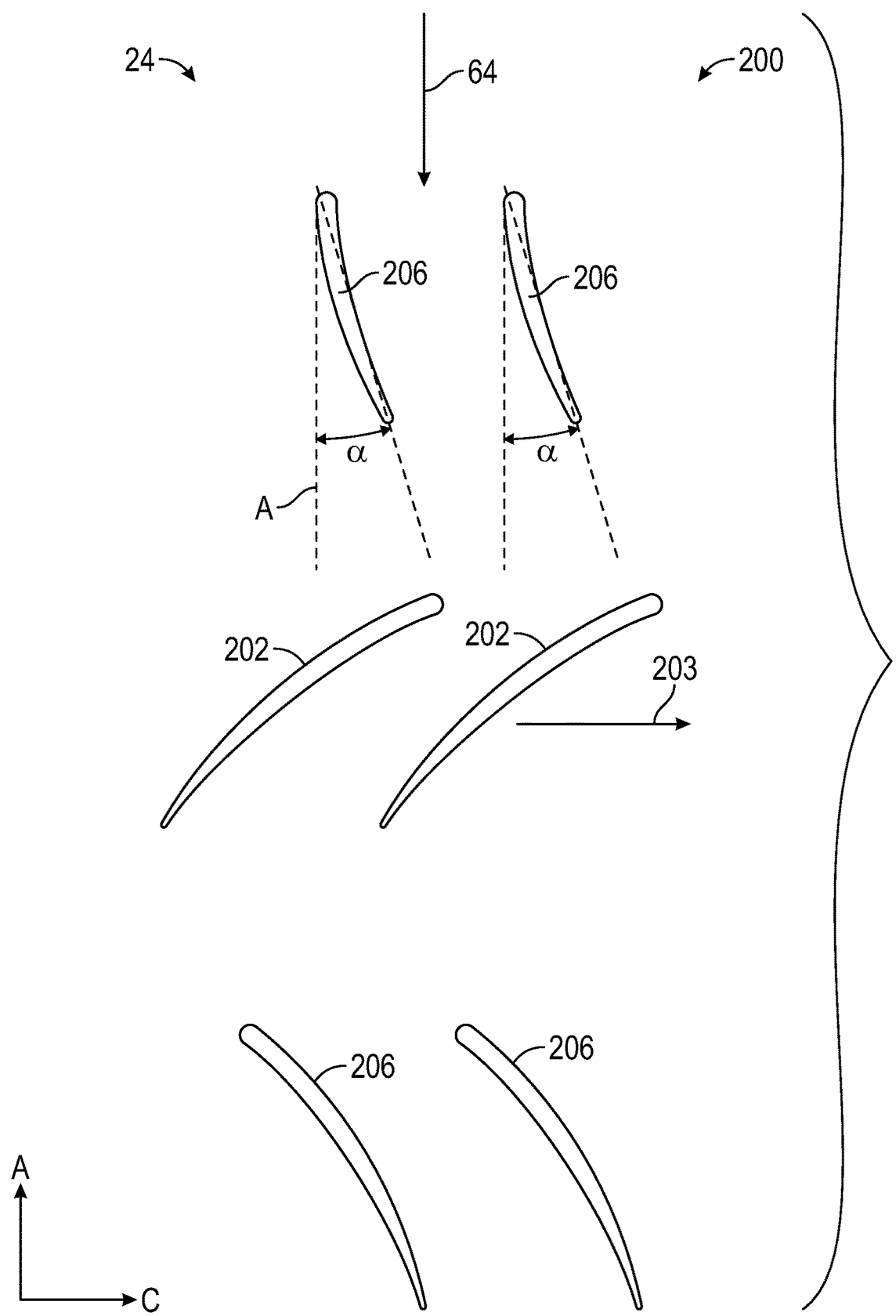
FIG. 2B is a schematic plan view of a portion of the HP rotor of FIG. 2A, according to the present disclosure.

FIG. 2B is a schematic plan view of a portion of the HP rotor 200, according to the present disclosure. As shown in FIG. 2B, the second portion of air 64 flows axially between the plurality of VSVs 206 and the plurality of rotor blades 202 of each stage of the HP compressor 24. The HP shaft 34 (FIG. 2A) rotates (as indicated by arrow 203) to rotate the plurality of rotor blades 202 circumferentially about the centerline axis 12 (FIG. 1). The controller 304 (FIG. 2A) can control the lever arms 214 (FIG. 2A) to rotate the plurality of VSVs 206 about the VSV pitch axis $P_{VSV}$ (FIG. 2A). In this way, the controller 304 can control an incidence angle $\alpha$ of the plurality of VSVs 206, as detailed further below. The incidence angle $\alpha$ is an angle of the plurality of VSVs 206 in the circumferential direction C with respect to the axial direction A. Changing the incidence angle $\alpha$ changes axial forces on the plurality of rotor blades 202 downstream of the plurality of VSVs 206. For example, changing the incidence angle $\alpha$ changes the velocity of the incoming air stream (e.g., the second portion of air 64), thereby changing the axial forces through the HP rotor 200. The incidence angle $\alpha$ can be changed to reduce rotor vibrations in the HP rotor 200, in particular, as the HP rotor 200 approaches the thrust crossover condition, as detailed further below.

Figure 3:
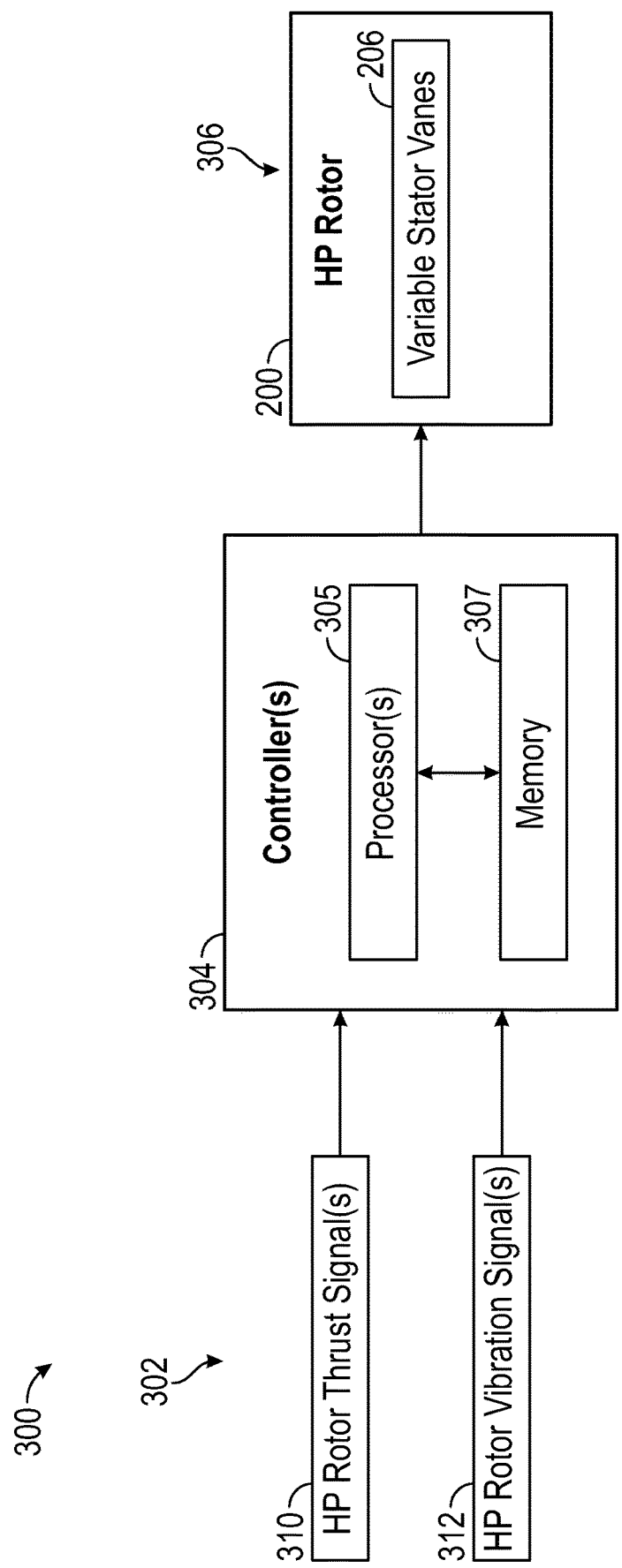
FIG. 3 is a schematic view of an HP rotor control system for operation and control of at least portions of the turbine engine, according to the present disclosure.

FIG. 3 is a schematic view of an HP rotor control system 300 for operation and control of at least portions of the turbine engine 10 (FIG. 1), according to the present disclosure. The HP rotor control system 300 includes inputs 302, the controller 304, and outputs 306. The inputs 302 include one or more HP rotor thrust signals 310 from the HP rotor 200 and one or more HP rotor vibration signals 312 from the one or more vibration sensors 230 (FIG. 2A). The one or more HP rotor thrust signals 310 are indicative of an amount of thrust through the HP rotor 200. For example, the HP rotor thrust is a function of the HP rotor speed of the HP rotor 200 (e.g., the rotational speed of the HP shaft 34). The one or more HP rotor thrust signals 310 include an indication of the axial thrust through the HP rotor 200. The controller 304 can determine the HP rotor thrust via one or more HP rotor thrust models or HP rotor thrust maps for various engine operating conditions and HP rotor speeds. In some embodiments, the controller 304 determines the HP rotor thrust based on a comparison to engine test data for various engine operating conditions and HP rotor speeds.

The one or more HP rotor vibration signals 312 include electrical signals indicative of vibrations of the HP rotor 200. For example, the one or more HP rotor vibration signals 312 include electrical signals indicative of the vibrations at the outer casing 18 of the HP rotor 200 from the one or more vibration sensors 230 (FIG. 2A). The outputs 306 include the HP rotor 200 (e.g., the plurality of VSVs 206). For example, the outputs 306 include controlling HP rotor 200 (e.g., controlling the plurality of VSVs 206) to change the incidence angle $\alpha$ of the plurality of VSVs 206 to reduce HP rotor vibrations in the HP rotor 200 and to avoid the thrust crossover condition. The controller 304 receives the inputs 302, implements a method of controlling the HP rotor 200, and controls the outputs 306, as described with reference to FIG. 4 below.

The controller 304 may be a standalone controller or may be part of an engine controller to operate various systems of the turbine engine 10 (FIG. 1). In this embodiment, the controller 304 is a computing device having one or more processors 305 and a memory 307. The one or more processors 305 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 307 can include one or more computer-readable media, including, but not limited to, non-transitory computer-readable media, a computer readable non-volatile medium (e.g., a flash memory), a RAM, a ROM, hard drives, flash drives, or other memory devices.

The memory 307 can store information accessible by the one or more processors 305, including computer-readable instructions that can be executed by the one or more processors 305. The instructions can be any set of instructions or a sequence of instructions that, when executed by the one or more processors 305, cause the one or more processors 305 and the controller 304 to perform operations. The controller 304 and, more specifically, the one or more processors 305 are programmed or configured to perform these operations, such as the operations discussed further below. In some embodiments, the instructions can be executed by the one or more processors 305 to cause the one or more processors 305 to complete any of the operations and functions for which the controller 304 is configured, as will be described further below. The instructions can be software written in any suitable programming language or can be implemented in hardware. Additionally, or alternatively, the instructions can be executed in logically or virtually separate threads on the processors 305. The memory 307 can further store data that can be accessed by the one or more processors 305.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 304 is communicatively coupled to the one or more vibration sensors 230 (FIG. 2A) and to the HP shaft 34 (FIG. 2A). The controller 304 receives the inputs 302 and controls the outputs 306, as detailed further below.

Figure 4:
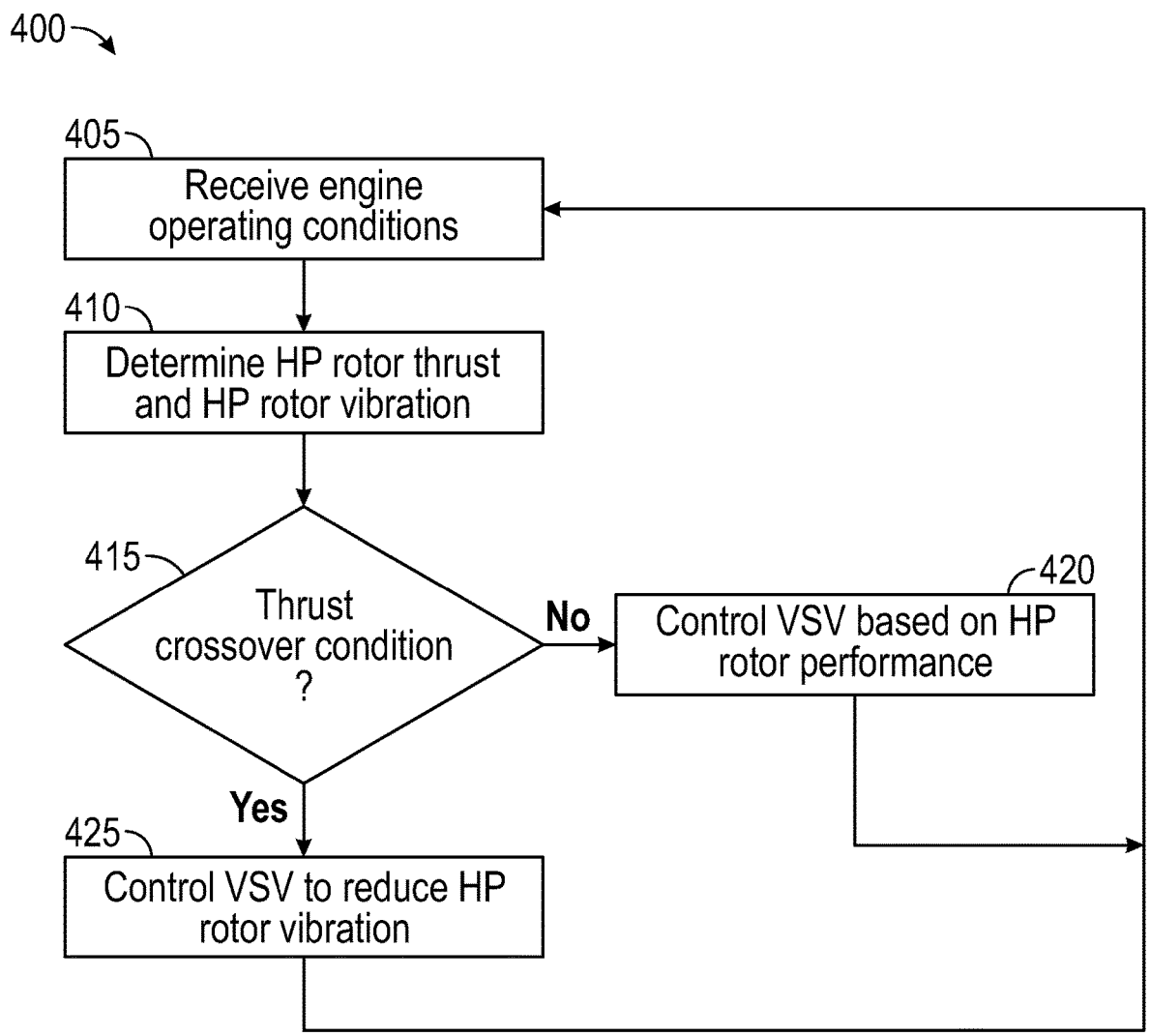
FIG. 4 is a flow diagram of a method of controlling the HP rotor of FIG. 2A, according to the present disclosure.

FIG. 4 is a flow diagram of a method 400 of controlling the HP rotor 200 (FIG. 2A), according to the present disclosure. Reference will be made to FIGS. 2A, 2B, and 3 in describing the method 400. In step 405, the controller 304 receives engine operating conditions of the turbine engine 10 (FIG. 1). For example, the controller 304 receives the one or more HP rotor thrust signals 310 and the one or more HP rotor vibration signals 312. The controller 304 can also receive ambient conditions of the turbine engine 10 and/or can receive engine mission parameters. The controller 304 can use the ambient conditions and/or the engine mission parameters to determine an operating mode of the turbine engine 10, such as, for example, whether the turbine engine 10 is operating at takeoff conditions, at climb conditions, at cruise conditions, at descent conditions, and/or at landing conditions. The ambient conditions include for example, temperature and pressure outside of, and within, the turbine engine 10. The HP rotor thrust and/or the HP rotor vibrations may vary based on the operating mode of the turbine engine 10 and/or based on the ambient conditions.

In step 410, the controller 304 determines the HP rotor thrust and the HP rotor vibration of the HP rotor 200. For example, the controller 304 derives the HP rotor thrust and the HP rotor vibration based on the one or more HP rotor thrust signals 310 and the one or more HP rotor vibration signals 312, respectively.

In step 415, the controller 304 determines whether the HP rotor 200 is approaching the thrust crossover condition. For example, the controller 304 determines that the HP rotor 200 is approaching the thrust crossover condition based on the HP rotor thrust and the HP rotor vibration. The controller 304 can compare the HP rotor thrust and the HP rotor vibration to predetermined thresholds and determine that the HP rotor 200 is approaching the thrust crossover condition. For example, the controller 304 compares the HP rotor thrust to an HP rotor thrust threshold and compares the HP rotor vibration to an HP rotor vibration threshold. If the HP rotor thrust is equal to or less than the HP rotor thrust threshold and the HP rotor vibration is greater than or equal to the HP rotor vibration threshold, then the controller 304 determines that the HP rotor 200 is approaching the thrust crossover condition.

In step 420, if the HP rotor 200 is not approaching the thrust crossover condition (step 415: No), the controller 304 controls the plurality of VSVs 206 based on the HP rotor 200 performance. For example, the controller 304 controls the plurality of VSVs 206 to change the incidence angle α to increase the stall margin and to avoid stall in the HP compressor 24. The controller 304 can control the plurality of VSVs 206 to change the incidence angle α to avoid stall for various operating modes of the turbine engine 10 (FIG. 1). For example, the stall margin is different for the various operating modes of the turbine engine 10.

In step 425, if the HP rotor 200 is approaching the thrust crossover condition (step 415: Yes), the controller 304 controls the plurality of VSVs 206 to reduce the HP rotor vibration and to avoid the thrust crossover condition. For example, the controller 304 controls the plurality of VSVs 206 to change (e.g., increase or decrease) the incidence angle α to increase the HP rotor thrust (e.g., the axial thrust) through the HP rotor 200 to increase the axial force on the one or more bearings 220. Increasing the axial force on the one or more bearings 220 increases the stiffness of the one or more bearings 220, thereby reducing the deflections of the one or more bearings 220 and reducing the vibrations through the HP rotor 200. In this way, the controller 304 controls the plurality of VSVs 206 to avoid the thrust crossover condition (where the HP rotor vibrations are the greatest). The controller 304 can change the incidence angle α by up to plus or minus five degrees (±5°) to reduce the HP rotor vibrations as the HP rotor 200 approaches the thrust crossover condition without sacrificing too much aerodynamic performance of the HP rotor 200.

The HP rotor control system 300 of the present disclosure controls the plurality of VSVs 206 to avoid the thrust crossover condition. In this way, the HP rotor control system 300 reduces vibrations caused by the thrust crossover condition in the HP rotor 200, and, thus, increases a lifecycle of the HP rotor 200, thereby increasing the lifecycle of the turbine engine 10.

Further aspects are provided by the subject matter of the following clauses.

A high-pressure (HP) rotor control system comprises an HP rotor including a plurality of rotor blades that rotate about a centerline axis, and a plurality of variable stator vanes (VSVs) that are rotatable about a variable stator vane (VSV) pitch axis, the plurality of VSVs disposed at an incidence angle, and a controller that controls the plurality of VSVs to rotate the plurality of VSVs about the VSV pitch axis to change the incidence angle of the plurality of VSVs as the HP rotor approaches a thrust crossover condition.

The HP rotor control system of the preceding clause, the HP rotor further including one or more bearings, and the controller controls the plurality of VSVs to rotate the plurality of VSVs about the VSV pitch axis as the HP rotor approaches the thrust crossover condition to increase axial forces on the one or more bearings.

The HP rotor control system of any preceding clause, the HP rotor including an HP compressor, an HP turbine, and an HP shaft that couples the HP compressor to the HP turbine.

The HP rotor control system of any preceding clause, the controller determining whether the HP rotor is approaching the thrust crossover condition, and controlling the plurality of VSVs to rotate the plurality of VSVs about the VSV pitch axis if the HP rotor is approaching the thrust crossover condition.

The HP rotor control system of any preceding clause, the controller controlling the plurality of VSVs to change the incidence angle based on HP rotor performance if the HP rotor is not approaching the thrust crossover condition.

The HP rotor control system of any preceding clause, the controller determining that the HP rotor is approaching the thrust crossover condition based on HP rotor thrust and HP rotor vibration of the HP rotor.

The HP rotor control system of any preceding clause, further including one or more vibration sensors, the controller determining the HP rotor vibration based on one or more HP rotor vibration signals received from the one or more vibration sensors.

The HP rotor control system of any preceding clause, the controller determining the HP rotor thrust based on engine mission parameters and ambient conditions.

The HP rotor control system of any preceding clause, the controller comparing the HP rotor thrust to an HP rotor thrust threshold, and compares the HP rotor vibration to an HP rotor vibration threshold.

The HP rotor control system of any preceding clause, the controller determining that the HP rotor is approaching the thrust crossover condition if the HP rotor thrust is less than or equal to the HP rotor thrust threshold and the HP rotor vibration is greater than or equal to the HP rotor vibration threshold.

The HP rotor control system of any preceding clause, the controller controlling the plurality of VSVs to change the incidence angle by up to ±5°.

The HP rotor control system of any preceding clause, the HP rotor being disposed in a turbine engine.

The HP rotor control system of any preceding clause, each of the plurality of VSVs including a spindle that rotates each of the plurality of VSVs.

The HP rotor control system of any preceding clause, each of the plurality of VSVs including a lever arm, the controller controlling the lever arm to rotate each of the plurality of VSVs about the VSV pitch axis.

The HP rotor control system of any preceding clause, further including one or more actuators coupled to the plurality of VSVs, the controller controlling the one or more actuators to rotate the plurality of VSVs about the VSV pitch axis.

The HP rotor control system of any preceding clause, the one or more bearings including a forward bearing located at a forward position of the HP rotor.

The HP rotor control system of any preceding clause, the controller being a Full Authority Digital Engine Control (FADEC).

The HP rotor control system of any preceding clause, the incidence angle being an angle of the plurality of VSVs in a circumferential direction with respect to an axial direction of the HP rotor.

The HP rotor control system of any preceding clause, changing the incidence angle changes the axial forces on the plurality of rotor blades downstream of the plurality of VSVs.

A method of controlling a high-pressure (HP) rotor, the HP rotor including a plurality of rotor blades that rotate about a centerline axis, and a plurality of variable stator vanes (VSVs) that rotate about a variable stator vane (VSV) pitch axis, the method comprising controlling, by a controller, the plurality of VSVs to rotate the plurality of VSVs about the VSV pitch axis to change an incidence angle of the plurality of VSVs as the HP rotor approaches a thrust crossover condition.

The method of the preceding clause, the HP rotor further including one or more bearings, and the method further comprises controlling, by the controller, the plurality of VSVs to rotate the plurality of VSVs about the VSV pitch axis as the HP rotor approaches the thrust crossover condition to increase axial forces on the one or more bearings.

The method of any preceding clause, the HP rotor including an HP compressor, an HP turbine, and an HP shaft that couples the HP compressor to the HP turbine.

The method of any preceding clause, further comprising determining, by the controller, whether the HP rotor is approaching the thrust crossover condition, and controlling, by the controller, the plurality of VSVs to rotate the plurality of VSVs about the VSV pitch axis if the HP rotor is approaching the thrust crossover condition.

The method of any preceding clause, further comprising controlling, by the controller, the plurality of VSVs to rotate the plurality of VSVs to change the incidence angle based on HP rotor performance if the HP rotor is not approaching the thrust crossover condition.

The method of any preceding clause, further comprising determining, by the controller, that the HP rotor is approaching the thrust crossover condition based on HP rotor thrust and HP rotor vibration of the HP rotor.

The method of any preceding clause, the HP rotor further including one or more vibration sensors, and the method further comprises receiving, by the controller, one or more HP rotor vibration signals from the one or more vibration sensors, and determining, by the controller, the HP rotor vibration based on the one or more HP rotor vibration signals.

The method of any preceding clause, further comprising determining, by the controller, the HP rotor thrust based on engine mission parameters and ambient conditions.

The method of any preceding clause, further comprising comparing, by the controller, the HP rotor thrust to an HP rotor thrust threshold, and comparing, by the controller, the HP rotor vibration to an HP rotor vibration threshold.

The method of any preceding clause, further comprising determining, by the controller, that the HP rotor is approaching the thrust crossover condition if the HP rotor thrust is less than or equal to the HP rotor thrust threshold and the HP rotor vibration is greater than or equal to the HP rotor vibration threshold.

The method of any preceding clause, further comprising controlling, by the controller, the plurality of VSVs to change the incidence angle by up to ±5°.

The method of any preceding clause, the HP rotor being disposed in a turbine engine.

The method of any preceding clause, each of the plurality of VSVs including a spindle that rotates each of the plurality of VSVs.

The method of any preceding clause, each of the plurality of VSVs including a lever arm, the method further comprising controlling, by the controller, the lever arm to rotate each of the plurality of VSVs about the VSV pitch axis.

The method of any preceding clause, further including one or more actuators coupled to the plurality of VSVs, the method further comprising actuating, by the controller, the one or more actuators to rotate the plurality of VSVs about the VSV pitch axis.

The method of any preceding clause, the one or more bearings including a forward bearing located at a forward position of the HP rotor.

The method of any preceding clause, the incidence angle being an angle of the plurality of VSVs in a circumferential direction with respect to an axial direction of the HP rotor.

The method of any preceding clause, changing the incidence angle changes the axial forces on the plurality of rotor blades downstream of the plurality of VSVs.

A turbine engine comprising a high-pressure rotor, the HP rotor including a plurality of rotor blades that rotate about a centerline axis, and a plurality of variable stator vanes (VSVs) that rotate about a VSV pitch axis, and a controller that controls the plurality of VSVs to rotate the plurality of VSVs about the VSV pitch axis to change an incidence angle of the plurality of VSVs as the HP rotor approaches a thrust crossover condition.

The turbine engine of the preceding clause, the HP rotor further including one or more bearings, and the controller controlling the plurality of VSVs to rotate the plurality of VSVs about the VSV pitch axis as the HP rotor approaches the thrust crossover condition to increase axial forces on the one or more bearings.

The turbine engine of any preceding clause, the HP rotor including an HP compressor, an HP turbine, and an HP shaft that couples the HP compressor to the HP turbine.

The turbine engine of any preceding clause, the controller determining whether the HP rotor is approaching the thrust crossover condition, and controls the plurality of VSVs to rotate the plurality of VSVs about the VSV pitch axis if the HP rotor is approaching the thrust crossover condition.

The turbine engine of any preceding clause, the controller controlling the plurality of VSVs to change the incidence angle based on HP rotor performance if the HP rotor is not approaching the thrust crossover condition.

The turbine engine of any preceding clause, the controller determining that the HP rotor is approaching the thrust crossover condition based on HP rotor thrust and HP rotor vibration of the HP rotor.

The turbine engine of any preceding clause, further including one or more vibration sensors, the controller determining the HP rotor vibration based on one or more HP rotor vibration signals received from the one or more vibration sensors.

The turbine engine of any preceding clause, the controller determining the HP rotor thrust based on engine mission parameters and ambient conditions.

The turbine engine of any preceding clause, the controller comparing the HP rotor thrust to an HP rotor thrust threshold, and comparing the HP rotor vibration to an HP rotor vibration threshold.

The turbine engine of any preceding clause, the controller determining that the HP rotor is approaching the thrust crossover condition if the HP rotor thrust is less than or equal to the HP rotor thrust threshold and the HP rotor vibration is greater than or equal to the HP rotor vibration threshold.

The turbine engine of any preceding clause, the controller controlling the plurality of VSVs to change the incidence angle by up to ±5°.

The turbine engine of any preceding clause, each of the plurality of VSVs including a spindle that rotates each of the plurality of VSVs.

The turbine engine of any preceding clause, each of the plurality of VSVs including a lever arm, the controller controlling the lever arm to rotate each of the plurality of VSVs about the VSV pitch axis.

The turbine engine of any preceding clause, further including one or more actuators coupled to the plurality of VSVs, the controller controlling the one or more actuators to rotate the plurality of VSVs about the VSV pitch axis.

The turbine engine of any preceding clause, the one or more bearings including a forward bearing located at a forward position of the HP rotor.

The turbine engine of any preceding clause, the controller being a Full Authority Digital Engine Control (FADEC).

The turbine engine of any preceding clause, the incidence angle being an angle of the plurality of VSVs in a circumferential direction with respect to an axial direction of the HP rotor.

The turbine engine of any preceding clause, changing the incidence angle changes the axial forces on the plurality of rotor blades downstream of the plurality of VSVs.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A high-pressure (HP) rotor control system comprising:
 an HP rotor including a plurality of rotor blades that rotate about a centerline axis, and a plurality of variable stator vanes (VSVs) that are rotatable about a variable stator vane (VSV) pitch axis, the plurality of VSVs disposed at an incidence angle; and
 a controller that:
  determines whether the HP rotor is approaching a thrust crossover condition; and
  controls the plurality of VSVs to rotate the plurality of VSVs about the VSV pitch axis to change the incidence angle of the plurality of VSVs if the HP rotor is approaching the thrust crossover condition.

2. The HP rotor control system of claim 1, wherein the HP rotor further includes one or more bearings, and the controller controls the plurality of VSVs to rotate the plurality of VSVs about the VSV pitch axis as the HP rotor approaches the thrust crossover condition to increase axial forces on the one or more bearings.

3. The HP rotor control system of claim 1, wherein the HP rotor includes an HP compressor, an HP turbine, and an HP shaft that couples the HP compressor to the HP turbine.

4. The HP rotor control system of claim 1, wherein the controller controls the plurality of VSVs to change the incidence angle based on HP rotor performance if the HP rotor is not approaching the thrust crossover condition.

5. The HP rotor control system of claim 1, wherein the controller determines that the HP rotor is approaching the thrust crossover condition based on HP rotor thrust and HP rotor vibration of the HP rotor.

6. The HP rotor control system of claim 5, further including one or more vibration sensors, wherein the controller determines the HP rotor vibration based on one or more HP rotor vibration signals received from the one or more vibration sensors.

7. The HP rotor control system of claim 5, wherein the controller determines the HP rotor thrust based on engine mission parameters and ambient conditions.

8. The HP rotor control system of claim 5, wherein the controller compares the HP rotor thrust to an HP rotor thrust threshold, and compares the HP rotor vibration to an HP rotor vibration threshold.

9. The HP rotor control system of claim 8, wherein the controller determines that the HP rotor is approaching the thrust crossover condition if the HP rotor thrust is less than or equal to the HP rotor thrust threshold and the HP rotor vibration is greater than or equal to the HP rotor vibration threshold.

10. A method of controlling a high-pressure (HP) rotor, the HP rotor including a plurality of rotor blades that rotate about a centerline axis, and a plurality of variable stator vanes (VSVs) that rotate about a variable stator vane (VSV) pitch axis, the method comprising:
 determining, by a controller, whether the HP rotor is approaching a thrust crossover condition; and
 controlling, by the controller, the plurality of VSVs to rotate the plurality of VSVs about the VSV pitch axis to change an incidence angle of the plurality of VSVs if the HP rotor is approaching the thrust crossover condition.

11. The method of claim 10, wherein the HP rotor further includes one or more bearings, and the method further comprises controlling, by the controller, the plurality of VSVs to rotate the plurality of VSVs about the VSV pitch axis as the HP rotor approaches the thrust crossover condition to increase axial forces on the one or more bearings.

12. The method of claim 10, wherein the HP rotor includes an HP compressor, an HP turbine, and an HP shaft that couples the HP compressor to the HP turbine.

13. The method of claim 10, further comprising controlling, by the controller, the plurality of VSVs to rotate the plurality of VSVs to change the incidence angle based on HP rotor performance if the HP rotor is not approaching the thrust crossover condition.

14. The method of claim 10, further comprising determining, by the controller, that the HP rotor is approaching the thrust crossover condition based on HP rotor thrust and HP rotor vibration of the HP rotor.

15. The method of claim 14, wherein the HP rotor further includes one or more vibration sensors, and the method further comprises receiving, by the controller, one or more HP rotor vibration signals from the one or more vibration sensors, and determining, by the controller, the HP rotor vibration based on the one or more HP rotor vibration signals.

16. The method of claim 14, further comprising determining, by the controller, the HP rotor thrust based on engine mission parameters and ambient conditions.

17. The method of claim 14, further comprising comparing, by the controller, the HP rotor thrust to an HP rotor thrust threshold, and comparing, by the controller, the HP rotor vibration to an HP rotor vibration threshold.

18. The method of claim 17, further comprising determining, by the controller, that the HP rotor is approaching the thrust crossover condition if the HP rotor thrust is less than or equal to the HP rotor thrust threshold and the HP rotor vibration is greater than or equal to the HP rotor vibration threshold.

19. The method of claim 10, further comprising controlling, by the controller, the plurality of VSVs to change the incidence angle by up to ±5°.

20. The HP rotor control system of claim 1, wherein the controller controls the plurality of VSVs to change the incidence angle by up to ±5°.

\* \* \* \* \*